United States Patent [19]

Chao

[11] Patent Number: 4,812,276

[45] Date of Patent: Mar. 14, 1989

[54] STEPWISE FORMATION OF CHANNEL WALLS IN HONEYCOMB STRUCTURES

[75] Inventor: Tai-Hsiang Chao, Mt. Prospect, Ill.

[73] Assignee: Allied-Signal Inc., Morristown, N.J.

[21] Appl. No.: 188,783

[22] Filed: Apr. 29, 1988

[51] Int. Cl.[4] .............................................. B29C 47/12

[52] U.S. Cl. .......................... 264/177.11; 264/177.12; 264/209.8; 425/198; 425/461; 425/467

[58] Field of Search ...................... 264/177.11, 177.12, 264/177.16, 209.8; 425/197–199, 380, 382.4, 461–467

[56] References Cited

U.S. PATENT DOCUMENTS

| | | | |
|---|---|---|---|
| 1,152,978 | 9/1915 | Royle | 425/192 |
| 3,380,129 | 4/1968 | Magruder | 425/467 |
| 3,559,252 | 2/1971 | Schmidt et al. | 425/192 |
| 3,778,217 | 12/1973 | Bustamante et al. | 425/467 |
| 3,790,654 | 2/1974 | Bagley | 264/177 |
| 3,824,196 | 7/1974 | Benbow et al. | 252/455 R |
| 3,905,743 | 9/1975 | Bagley | 425/464 |
| 4,413,968 | 11/1983 | Bliss | 425/467 |
| 4,468,366 | 8/1984 | Socha, Jr. | 264/177.12 |
| 4,550,005 | 10/1985 | Kato | 264/177.12 |
| 4,743,191 | 5/1988 | Chao | 425/190 |
| 4,747,986 | 5/1988 | Chao | 264/177.11 |

FOREIGN PATENT DOCUMENTS

| | | | |
|---|---|---|---|
| 299852 | 8/1917 | Fed. Rep. of Germany | 425/461 |

*Primary Examiner*—Jan H. Silbaugh
*Assistant Examiner*—Jill L. Heitbrink
*Attorney, Agent, or Firm*—Harold N. Wells; Thomas K. McBride; John G. Tolomei

[57] ABSTRACT

A method for forming honeycomb structures by stepwise formation of channel walls reduces the pressure loading imposed by the extrudable material on a die that uses this method, facilitates the formation of well knitted channel walls, and requires only a minimum amount of lateral flow in the discharge zone to perform final interconnections between channel walls that have been substantially formed upstream of the discharge zone. The method presses extrudable material in substantially axial flow through a fist partitioning zone and subdivides the material into a series of flow segments having on their outer surfaces a portion of the channel wall surfaces formed. The extrudable material passes from the first partitioning zone in substantially axial flow while at least a portion of the channel walls formed in the first partitioning zone are maintained on the surface of the segments. Next, the extrudable material passes through one or more additional partitioning zones that again subdivide the feed material into additional flow segments by displacing at least a portion of the extrudable material from the axial flow path of the upstream flow segments, thereby forming additional portions of the channel walls on the surface of the segments. As the extrudable material continues to flow through subsequent partitioning zones, the portion of the channel walls formed in upstream partitioning zones are substantially maintained. The extrudable material passes through a discharge zone located downstream of the partitioning zones which causes the extrudable material to flow laterally and fill minor gaps in the channel walls that were left after passage of the extrudable material through the partitioning zones. An extruded honeycomb structure having a plurality of intersecting channels is recovered from the discharge zone. The method can be used with as few as two partitioning zones or as many as four or more partitioning zones.

19 Claims, 6 Drawing Sheets

Fig. 6
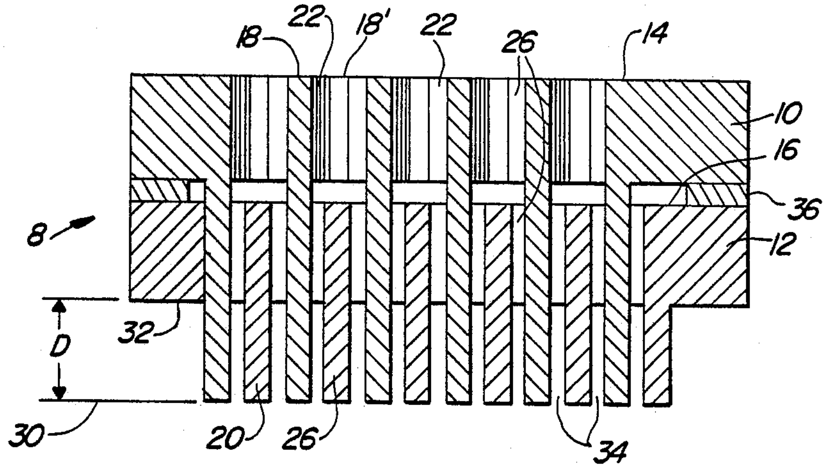
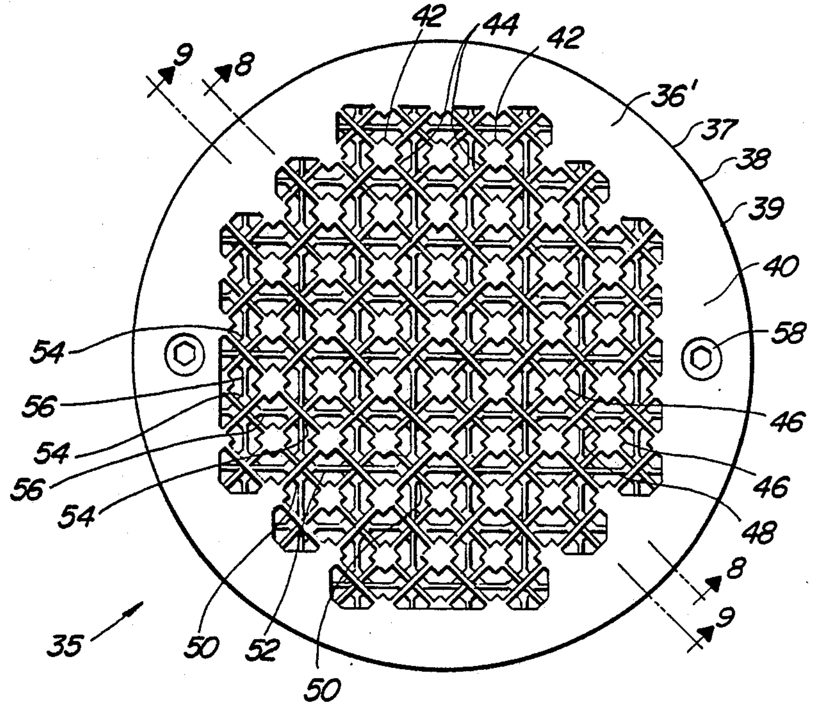
Fig. 7

STEPWISE FORMATION OF CHANNEL WALLS IN HONEYCOMB STRUCTURES

BACKGROUND OF THE INVENTION

This invention relates generally to honeycomb structures formed of ceramic materials. More specifically, this invention relates to the forming of ceramic materials into thin wall honeycomb structures by extrusion.

DESCRIPTION OF THE PRIOR ART

The term "honeycomb structures" is used generally to describe a thin walled body having a series of regularly or irregularly shaped parallel channels that extend continuously over the length of the body and are separated by wall elements that give the body its structure. The cross-section of each channel may vary from channel to channel but usually will have a regular geometric shape. These honeycomb structures find use in regenerators, heat exchange equipment, filters, and as catalyst carriers. The use of such carriers is also well known in the treatment of automotive exhaust gases where the carriers are typically treated with a wash coat of catalytic material.

Ceramic honeycombs have been formed by extrusion methods. The extrusison method uses a hydraulic ram to push the extrudable material into a series of feed passages which communicate with a discharge area. The discharge area has a series of projections generally in the form of pins, that displace the extrudable material from the sections that will eventually correspond to the channels of the extrusion, and define a series of gaps which shape the extrudable material into the walls of the honeycomb structure. It has become common practice to extrude honeycombs having channel densities of from 80 to 450 channels per square inch upon extrusion, and 100 to 600 channels per square inch after shrinkage of the extrudable material during curing. Typically, the wall thicknesses between the channels of the honeycomb structure will vary between 0.002 inch and 0.050 inch. Methods and apparatus for forming honeycomb structures are further described in a number of U.S. patents.

The dies and methods of forming honeycomb structures rely on lateral flow of the extrusion material to fill in those portions of the channel walls that are not in direct communication with the feed passages. Consequently, the discharge zone must have a relatively long axial length to assure an adequate flow impedance for causing the extrudable material to flow laterally and connect the channel walls in areas not having a direct alignment with the feed passages. The length and width of the non-directly aligned areas varies with the particular die design. All of the die designs require interconnection of the channel forming pins for support and suspension of the pins in the discharge zone. Some die designs provide substantial areas of interconnection. This results in a flow path for extrudable material that relies entirely on lateral flow for filling the channel walls. Other die designs minimize the interconnections by the use of square pins connected about their corners, however even these designs will have at least four connection points between channel form pins so that lateral flow is required for form a portion of each channel wall. This requirement for lateral flow to form each channel wall increases the flow impedance needed in the discharge zone. Overall flow impedance and the surface area presented by the interconnections raise the overall pressure required to push the extrudable material through the die and form the honeycomb structure.

It is also known that the extrudable material has a tendency to function as a continuation of the feed passages. Therefore, there is a tendency for the extrudable material not to flow laterally despite the impedance offered by the discharge zone. The methods in practice that require lateral flow to form all of the channels increase the susceptibility of the honeycomb structure to incomplete knitting of the extrudable material across channel walls.

Of course, minimizing the lateral flow by using multiple interconnections between all adjacent pins tends to reduce this susceptibility. These methods have the drawback of initially pressing the extrudable material through an area that is largely blocked by the transverse profile of all pins and interconnections. In turn, all of the pins need substantial interconnection to withstand the high pressures imposed thereon by the extrudable material as it is displaced by the pins and interconnections. Providing adequate strength to withstand applied pressures increases the required thickness of the die and complicates the necessary techniques for forming the die.

INFORMATION DISCLOSURE

U.S. Pats. Nos. 3,905,743 and 3,790,654, issued to Bagley, describe a method for forming a thin walled honeycomb extrusion that uses a die having feed passages and intersecting feed slots. Bagley claims and primarily teaches aligning the feed passages to communicate directly with the interconnections or intersections between a series of orthogonal slots.

U.S. Pat. No. 3,824,196, issued to Benbow et al, describes a method of making a thick walled honeycomb structure by passing a plastic material through a die having a series of feed passages that again intersect and communicate directly with intersecting points in a series of orthogonal slots that define the shape of the extrusion. Benbow also teaches that the feed passages should have a greater cross-sectional area than the transverse cross-sectional area of the discharge slots in order to provide sufficient material for filling the discharge slots. In Benbow, a large portion of the discharge slots are in direct axial communication with the feed passages.

U.S. Pat. No. 4,550,005, issued to Kato, teaches a method of extruding a honeycomb structure having walls of varied thickness and a die for use therein. The die and the method of Kato use feed passages having a hydraulic diameter that varies in relation to the walled portion being formed thereby. The feed passages are varied such that feed passageways associated with a thin walled portion have a relatively large hydraulic diameter, and feed passageways associated with thick wall portions have a relatively small hydraulic diameter.

U.S. Pat. No. 3,778,217, issued to Bustamante et al, teaches a die for forming multi-channeled honeycomb structures from a plastic material having channel forming pins supported from separable die body elements. The extrudable material first enters a section of the die having channel forming pins grouped about an inner central portion of the die before entering a second portion of the die wherein one or more rings of channel forming pins surround the central channel forming pins to fully define the shape of the extruded honeycomb structure.

U.S. Pat. No. 1,152,978, issued to Royle, discloses a die for manufacturing tubing having large channels from a plastic material. The plastic material first enters a die section containing spaced apart rows of channels forming pins. The extrudable materials flow past the first section to a second section that contains additional rows of channel forming pins placed between the first mentioned spaced apart rows.

U.S. Pat. No. 3,559,252, issued to Schmidt et al, depicts a die for extruding multi-channeled honeycomb structures wherein the extrudable material enters the die through a series of feed passages that are in axial alignment with the channel forming pins of the die, is directed radially outward from the feed passages, and flows into a final section of the die containing channel forming pins.

U.S. Pat. No. 4,468,366, issued to Socha, acknowledges the problem of improper knitting between channel walls by the tendency of the discharge slots to act as a continuation of the feed passages and discloses a method of forming honeycomb structures that uses a laminated die to laterally displace extrudable material into a discharge zone.

BRIEF SUMMARY OF THE INVENTION

A method has now been disclosed for extruding honeycomb monoliths that increases the direct axial communication of extrudable material into the discharge zone, decreases the amount of lateral flow required in the discharge zone for connecting channel walls of the honeycomb structure, and reduces the amount of interconnection between channel forming pins that block the flow of the extrudable material. Accordingly, this invention is the first method of extruding honeycomb structures that uses a stepwise formation of the channel walls by partitioning the flow of extrudable material into segments wherein succeeding portions of the channel wall are formed and maintained as the extrudable material passes through the die and takes on the shape of the desired honeycomb structure.

It is an object of this invention to provide a method of extruding honeycomb structures that requires less lateral flow for the formation of channel walls.

It is another object of this invention to provide a method for extruding honeycomb structures that reduces the amount of pressure required to press the extrudable material into the shape of the honeycomb structure.

It is a yet further object of this invention to provide a method for forming honeycomb structures that increases the strength of the channel walls.

It is a yet further object of this invention to provide a method of forming honeycomb structures that reduces the impedance required in the discharge zone to connect channel walls.

A yet further object of this invention is to provide a method of forming honeycomb structures that reduces the amount of transverse area that must be blocked off from the axial flow of extrudable material for the purpose of supporting the channel forming pins.

Therefore, in one aspect, this invention is a method for forming honeycomb structures having a plurality of channels with intersecting channel walls from extrudable material. Forming of the honeycomb structure begins with pressing extrudable material in substantially axial flow through a partitioning zone that subdivides the material into a number of parallel and distinct flow segments. Subdividing the flow segments forms a portion of the channel walls on the surface of the flow segments. Once formed, almost all of the portion of the channel walls formed on the surface of the segment remains formed as the extrudable material is passed out of the partitioning zone. The extrudable material is pressed again through one or more similar partitioning zones to again subdivide the feed mixture into parallel and distinct flow segments and displace additional portions of the extrudable material from the axial flow path of the first produced segments, thereby forming a second portion of the channel walls on the surface of the flow segments, while substantially maintaining the form of the portion of the channel walls formed in the first-mentioned partitioning zones. After passage through the partitioning zones, the extrudable material enters the discharge zone in a shape substantially conforming to the desired shape of the honeycomb structure except for small portions of unconnected channel walls. The extrudable material flow laterally in the discharge zone to complete the formation of the channel walls. An extruded honeycomb structure having a plurality of intersecting channel walls is recovered from the discharge zone.

This method facilitates the formation of honeycomb structures in general and gives honeycomb structures formed by this method excellent structural integrity across all of the channel walls. Formation of honeycomb monoliths is facilitated by reducing the area of interconnections between the channel forming pins that block axial flow of the extrudable material. In addition, the overall resistance of the extrudable material as it is pressed into the shape of the honeycomb structure is reduced by gradually deflecting the extrudable material with channel forming pins in a series of steps as the extrudable material takes on the shape of the honeycomb structure. The structural integrity of the channel walls are improved by having at least some of the channel walls fully formed before the extruded material takes its final shape in the discharge zone.

Other advantages, aspects, and embodiments of this invention are presented in the following detailed description of the preferred embodiments.

BRIEF DESCRIPTION OF THE DRAWINGS

FIG. 6 is a modified view of the die of FIG. 2 showing a spacer ring sandwiched between die elements.

FIG. 7 is a plan view of an alternate die arrangement showing the inlet side or the top of a die used in the method of this invention.

DETAILED DESCRIPTION OF THE INVENTION

Figure 1:
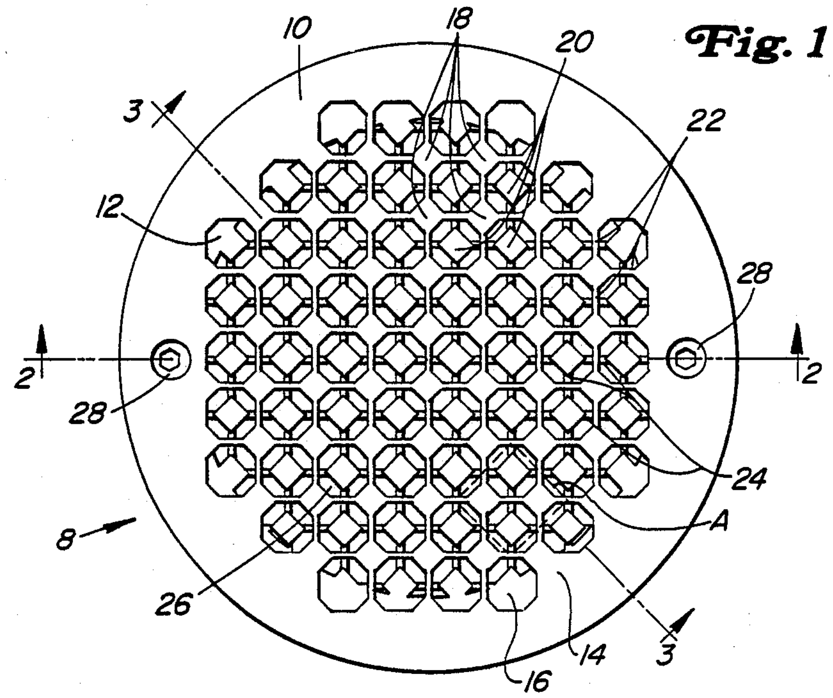
FIG. 1 is a plan view showing the inlet side or top of an extrusion die used in the method of this invention.

The method of this invention can be more easily understood by following the flow path of extrudable material through a die that is suitable for practicing the method of this invention. FIGS. 1 and 7 show plan views of the inlet side of dies having different configurations, both of which are suitable for practicing the method of this invention. The explanation of the method will begin with a full description of the die of FIG. 1. For purposes of this description, the term "upstream" will be used with respect to the flow of extrudable material through a die from an inlet face through a discharge area and out of an outlet face.

Referring then to FIG. 1, this view depicts an extrusion die 8 having an upper die body 10 and a lower die body 12. The top faces of upper and lower die bodies 10 and 12 present inlet surfaces 14 and 16, respectively. A series of channel forming pins 18 are arranged in a rectangular grid work across the inlet face of die body 10. A similar grid work of pins 20 is arranged across the face of the lower die body 12. Pins 18 and 20 are in a relative offset pattern such that each pin in one set has a projection through the middle of pin group of another set. A series of orthogonally arranged webs 22 and 24 for the upper and lower pin sets, respectively, act as interconnections and join the pins in each pin set and support the pins from their associated die body. These webs are designed to provide adequate support to the pins under the pressure imposed by the flow of extrudable material, which is reduced by the practice of this invention.

Extrudable material passes through the upper die body by flowing through the octagonal openings defined by the lateral faces of adjacent pins and their connecting webs. The lateral surface of each set of pins and interconnected webs form a series of partitions that together represent a partitioning zone for subdividing the flow of extrudable material into a series of axially flowing segments. Although the lower die body has the same octagonal shaped openings that define another series of partitions, its openings are partially filled by the pins of the upper die body. Together, upper and lower die bodies 10 and 12 leave a space through the die that is completely open to axial flow and define a series of feed passages 26 having an irregular hexagon shape. Feed passages 26 communicate extrudable material from the inlet surface 14 of the upper die body 10 to the discharge area of the die located below webs 24. For purposes of illustration, the pins are shown in reduced size relative to the feed passages. In normal practice, the feed passages are usually much narrower in width. A set of cap screws 28 provide the means for maintaining the relative spacing between the channel pins by securing the two die bodies together.

Figure 2:
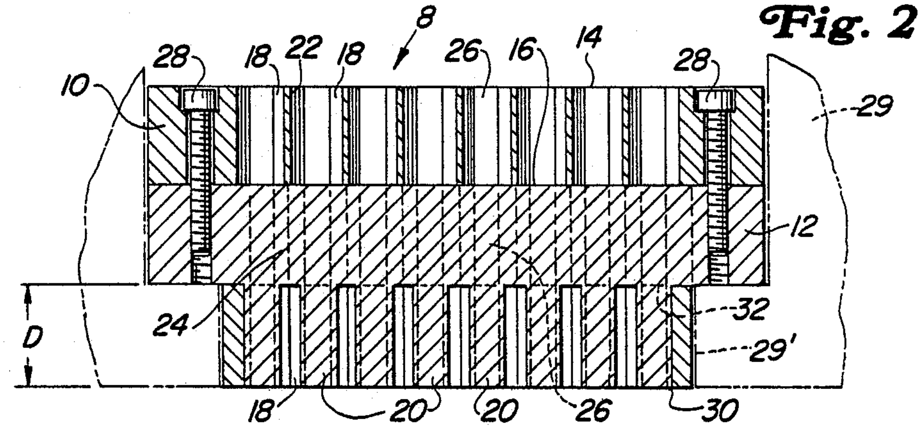
FIG. 2 shows a section of the die taken across line 2-2 of FIG. 1.

FIG. 2 shows the arrangement of the cap screws in a cross-section of the die taken parallel to and across the middle row of lower die body webs 24. Cap screws 28 extend through upper die body 10 and are threaded into the lower die body 12 to secure the two die bodies together. When in use, the entire die 8 rests in the jaws 29 of a hydraulic press that forces extrudable material against inlet surface 14. The tops of pins 18 and webs 22 extend up to inlet surface 14. Pins 18 also extend downward past inlet surface 16 of lower die body 12 and down to the outlet end 30 of the discharge zone, the discharge zone being that portion of the die extending below the outlet surface 32 of lower die body 12 up to outlet end 30. Webs 22 of the upper die body also extend downward from inlet surface 14 but only to inlet surface 16 of the lower die body. Pins 20 of the lower die body extend from inlet surface 16 to the outlet end 30 of the discharge zone. FIG. 2 shows both sets of pins 18 and 20 ending at outlet end 30, however in order to vary wall geometry of the extruded structure, some or all of the pins in either pin set may extend to different levels within the discharge zone. Feed passages 26 communicate the extrudable mixture from inlet surface 14, across die bodies 10 and 12, and past outlet surface 32 into discharge zone D.

Figure 3:
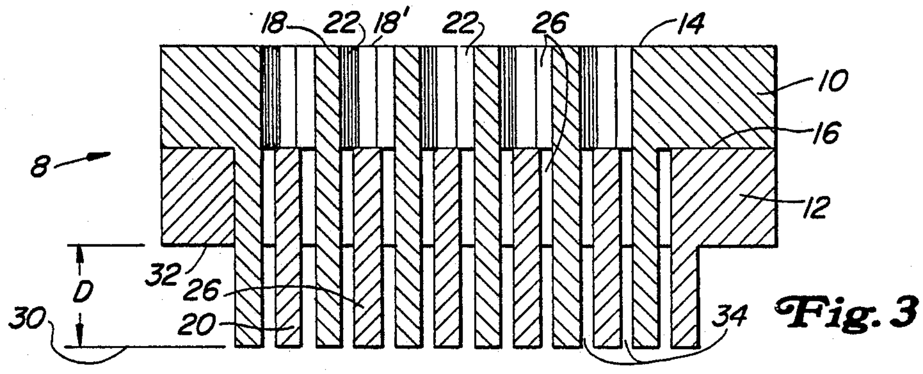
FIG. 3 shows a section of the die taken across line 3-3 of FIG. 1.

The configuration and relative relationship of the feed passages and pin sets are shown more clearly in FIG. 3 which is a cross-section of the die body taken parallel to the faces of the pins. The continuous length of pins 18 cut by section line 3—3 is shown from inlet surface 14 to outlet end 30. Webs 22 diagaonally bridge the space between the sectioned pins 18 and the next row of upper die body pins 18' which are located behind the sectioned pins. The view of pins 18' below inlet surface 16 is blocked by pins 20 of the lower die body which again extend from inlet surface 16 to outlet end 30. Again, feed passages 26 consist of the large octagonal openings in the upper die body defined by pins 18 and webs 22, and the directly subadjacent area below inlet surface 16 which remains open after insertion of pins 18 through lower die body 12. The lower ends of feed passages 26 communicate with discharge area D which comprises a series of discharge slots 34. In order to prevent extrudable material from flowing laterally out of the slots 34, cylindrical face 29' of press jaws 29 blocks the outer circumference of discharge zone D.

Figure 4:
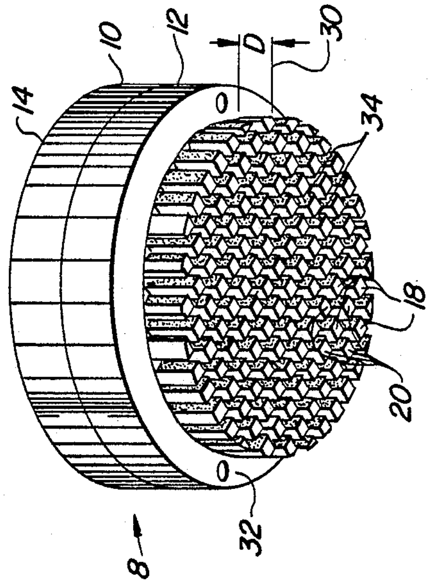
FIG. 4 is an isometric view of the discharge side or bottom of the die of FIG. 1.

FIG. 4 shows the die in three dimensions and illustrates the configuration of discharge zone D. Discharge slots 34 extend in an orthogonal arrangement over length D of the discharge zone and are defined by the mutually perpendicular faces of pins 18 and 20. Slots 34 intersect at the ends of the pin faces. The geometry of slots 34 define the final cross-section of a honeycomb structure that is formed within the discharge zone and ejected through outlet surface 32.

Although the feed passages have an irregular hexagon shape when viewed through the entire die, the portions of pins 18 below webs 22 are completely surrounded by open space that can be filled with extrudable material. By providing the open space around pins 18, channel walls completely surrounding the channel left by pin 18 can be formed upstream of the discharge zone. In the discharge area, only that portion of the die occupied by webs 24 must be filled by lateral flow of the extrudable material. This amount of lateral flow area represents a very small amount of the total flow area of the discharge zone. In fact, counting the number of webs 24 that cross square A in FIG. 1 shows that for the four channels formed by the four enclosed pins, only six webs cross the outline of the square. This means that the number of small interconnection points that must be filled laterally in the discharge zone is less than twice the number of channels formed.

Figure 5:
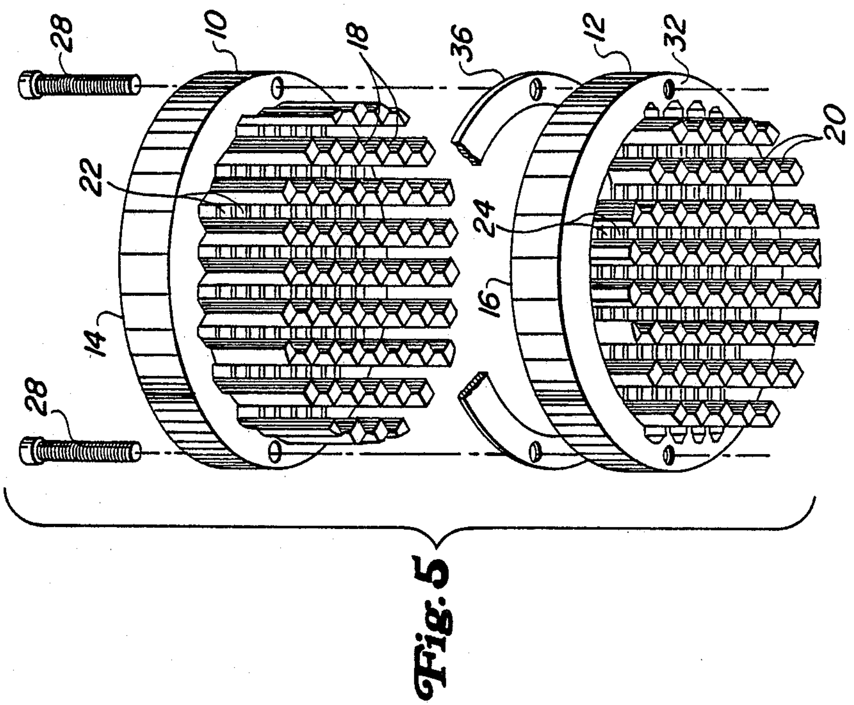
FIG. 5 is an exploded view of the die of FIG. 4 showing the inclusion of a spacer ring.

An understanding of the shape of each die body can be obtained from FIG. 5 which shows an exploded view of the die and an optional spacer ring 36. Spacer ring 36 may be used to vary the relative projection of the pins at outlet end 30 of the discharge zone and/or provide an open area between the bottom of webs 22 and inlet surface 16. Spacer ring 36 displaces the entire die body 10 upwardly relative to the lower die body 12. When the die is designed, as shown in FIG. 4, such that the lower ends of pins 18 and 20 are normally at the same elevation when the two die bodies are held together, addition of spacer ring 36 will displace upper die body pins 18 to obtain a desired degree of pin elevation difference. Addition of spacer ring 36 will not interfere with the operation of the feed passages since the entire center section of the spacer is left open. In fact, the spacer ring may be used solely for the purpose of leaving an open space above inlet surface 16 for lateral redistribution of the extrudable material.

In regard to the injection of extrudable material into discharge slots 34, the instant method facilitates this function by maximizing the direct axial communication of extrudable material to the discharge slots. The open area of the feed passages that communicate directly with the discharge slots of the discharge zone have a cross-section that substantially matches the cross-section of the non-intersecting portion of the discharge slots. By this arrangement, the extrudable material has the most open communication with sections of the discharge slots that have the minimum hydraulic diameter. Preferentially, feeding the extrudable material to minimum hydraulic diameter sections of the discharge slots assures that these sections of the discharge slots are completely filled to the maximum density thereby improving the structural strength of the final honeycomb structure and maximizing the quality of the wall sections where they are the thinnest and potentially the weakest. Since the thinnest wall sections have the smallest hydraulic diameters and thus the greatest resistance to flow, lateral movement of the extrudable mixtures into the relatively small area of the discharge slots that lie directly beneath webs 24 is encouraged as the mixture will seek the path of least resistance. As a result, this arrangement of feed passages may allow the overall length of the die to be reduced since the distance over which flow impedance is necessary for distribution is decreased by facilitation of lateral movement by the extrudable material. Additional information on the location of feed passages to introduce extrudable material to the discharge zone at points of increased flow resistance can be obtained from my copending application Ser. No. 946,234.

Any number of cross-sectional shapes can be formed by this method. These shapes include circles, squares, triangles, ovals, rectangles, hexagons, etc. In addition, the slots of the discharge zone may be arranged to provide any number of geometric patterns such as circular, triangular, or rectangular grid works.

Die bodies for practicing this invention are preferably made from a solid block of material. The segmented pins and webs may be formed by removing the base material of the die from the solid blocks through appropriate techniques. It has been found that in order to make very fine honeycombs, having 200 channels per inch or more, the necessary tolerance and uniformity can be easily achieved by electric discharge machining. It is also contemplated that laser cutting techniques can be advantageously employed to machine the die. This method is of particular advantage in the manufacture of honeycomb structures having ultra-fine channels, i.e. 600 or more per square inch, since it increases the spacing between adjacent pins in each die body. The increased spacing simplifies the required cutting operation. A variety of materials can be used for forming the die. The only requirements are that the material can be formed or machined into the shape of the desired die and will have sufficient strength to withstand the pressure exerted on the die during the extrusion process. A preferred material for the die is cold rolled steel. An advantage of employing burning methods, such as electric discharge machining or laser cutting techniques, to machine the die from cold rolled steel, is that the die stock may be hardened prior to the machining process.

The sequential forming of channel walls for the honeycomb structure in the method of this invention can be more fully appreciated by describing the flow of extrudable material through the cross-section of the die shown in Figure 3. Die 8 is placed in the bottom of a cylinder of a hydraulic press, not shown. Extrudable material is pushed by the piston of the press across inlet surface 14. As the extrudable material first contacts the inlet face, it is deflected by pins 18 and webs 22. Deflection by pins 18 and webs 22 subdivide the extrudable material into a series of segments enclosed by the common transverse spaces of pins 18 and webs 22. Since pins 20 do not extend up to the top of inlet surface 14, inlet surface 14 has a large open area for receiving the extrudable material and the only resistance to flow at the inlet surface 14 is created by the lateral deflection of the extrudable material around the relatively small transverse area of pins 18 and webs 22. Contact of the extrudable material with the lateral faces of pins 18 in each segment forms that portion of the channel wall that will eventually border a channel in the final honeycomb structure. Thus, a portion of the channel walls is preformed upstream of the discharge zone by partitioning the extrudable material into the segments. Thus, webs 22 and pins 18 form a partitioning zone that extends the length of webs 22 and initiates formation of final channel walls as soon as the extrudable material enters the die.

As the segments of extrudable material are passed below webs 22 and across inlet surface 16, another portion of the channel walls is formed. That portion of the channel walls that is already formed by contact with the sides of pins 18 maintains its shape as it passes another partitioning zone defined by webs 24 and pins 20. This shape is maintained by the continuous extension of pins 18 to the outlet end 30. The second partitioning zone resubdivides the downward flowing segments into a new arrangement of segments having a shape defined by the common surfaces of pins 20 and webs 24. The only resistance offered to the flow of extrudable material across inlet surface 16 is the transverse area of pins 20 and a portion of the transverse area of webs 24. Thus, the extrudable material must be principally deflected around pins 20 as it crosses inlet surface 16. However, since a portion of the extrudable material has been shaped to at least partially conform to the final structure of the honeycomb, a smaller amount of material must be displaced as it crosses inlet surface 16 so that the total resistance to flow offered by inlet surfaces 16 and 14 is reduced relative to that required to press the extrudable material across an inlet face that has the top of all channel forming elements at one elevation. In addition, the resistance to flow is further reduced since the total transverse area blocking inlet surface 16, i.e. the cross-section of pins 18 and 20 and webs 24, is smaller due to relatively small number of webs 24 that are needed in die body 12. As the extrudable material flows past the lateral faces of pins 20, another portion of the channel walls that define the channels in the final honeycomb structure are formed. The shape of the extrudable material adjacent the lateral surfaces of pins 20 is again maintained throughout the remaining length of the die. Before the extrudable material moves past outlet surface 32 into the discharge zone, the final channel walls of the honeycomb structure are formed to the point that they continuously surround the lateral surfaces of pins 18.

As a result, the only portion of the channel walls that define the final honeycomb structure left to be formed is that occupied by webs 24 in the upstream portion of the die. Only a small amount of lateral flow in the discharge zone is needed to fill in the relatively small spaces occupied by webs 24. As previously pointed out, the majority of the discharge zone is in direct axial alignment with the feed passages defined by the mutually open areas between the pins and webs. Therefore, unlike prior art methods where a majority of the honeycomb structure is formed in the discharge zone, this method only uses the discharge zone to fill relatively minor gaps in a honeycomb structure that has been largely defined upstream of the discharge zone.

The amount of flow area blocked by webs for connecting the pins and the number of spaces filled in the discharge zone can be further reduced by using more than two partitioning zones in the method of this invention. A die arrangement for passing the extrudable material through four partitioning zones is shown in FIG. 7. In FIG. 7, a die 35 composed of four layers of die bodies with a top die body 36′, a die body 37 directly below die body 36′, another die body 38 directly below die body 37, and a bottom die body 39. Die body 36′ has an inlet surface 40 which is open to the flow of extrudable material in a center portion about which rectangular pins 42 are held in a rectangular arrangement by webs 44 that extend from the center of the lateral faces of pins 42. Directly below webs 44 is an inlet surface for die body 37 having an open central portion about which square pins 46 are held in a rectangular arrangement by webs 48. Both sets of webs 48 and 44 are orthogonally arranged in a mutually parallel arrangemnt with webs 44 offset by half the distance across webs 48. Directly beneath webs 48, die body 38 has square pins 50 held in a square arrangement by webs 52. Each of webs 52 connects the corners of adjacent pins 50. Webs 52 are orthogonally arranged but at a 45-degree angle to webs 44 and 48. Directly below webs 52, a set of square pins 54 is held in a rectangular arrangement by a series of webs 56. Webs 56 connect every other pin 54 at all four corners. The other half of pins 54 are supported at two diagonal corners in an intermediate position by webs 56 half-way between two of pins 54 that are supported at the four corners. Uniform spacing between the die bodies is maintained by a set of screws 58 that extend through all four die bodies and clamp them together in unitary fashion.

Figure 8:
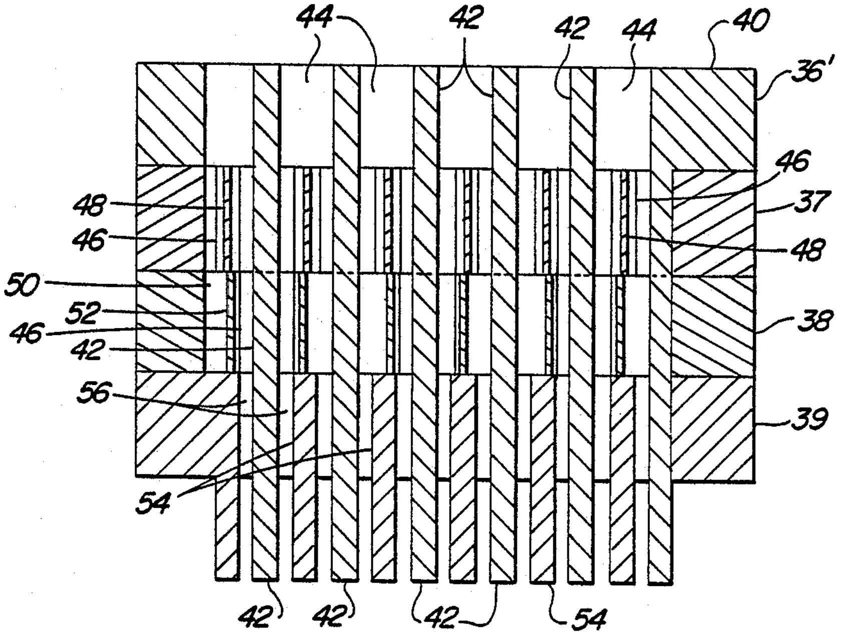
FIG. 8 is a cross-sectional view of the die of FIG. 7 taken across line 8—8.
Figure 9:
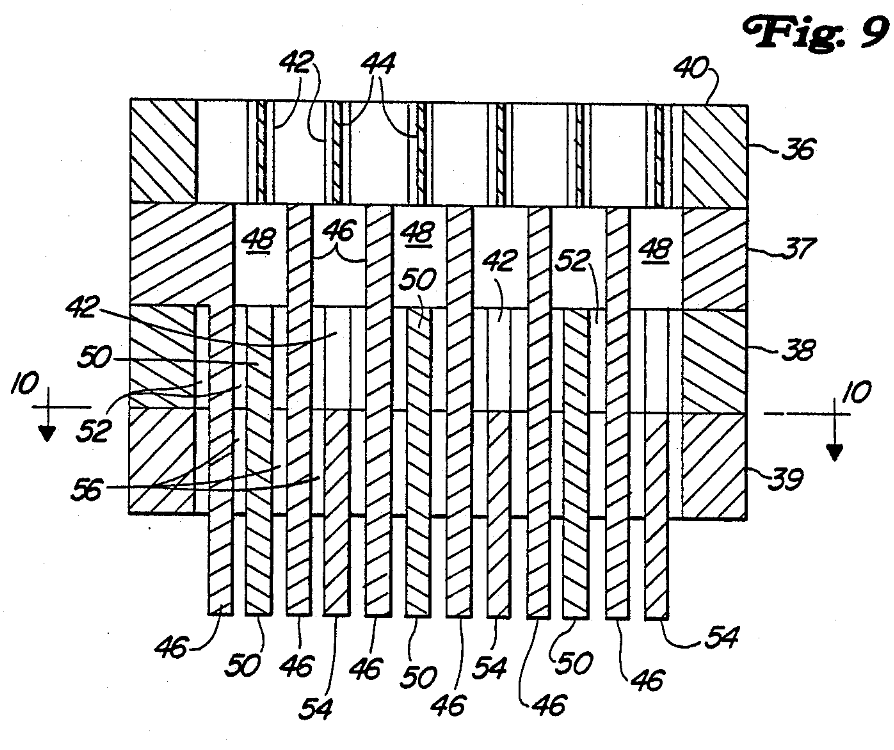
FIG. 9 is a cross-sectional view of the die of FIG. 7 taken across line 9—9.

The method of this invention will be discussed with the aid of Figures 8 and 9 by describing the flow of extrudable material through the cross-section of the die. Extrudable material is pressed past inlet face 40 and deflected around pins 42 as it is subdivided in a series of segments by a partitioning zone defined by the lateral faces of pins 42 and webs 44 between the transverse spaces of die body 36′. Partitioning of the flow forms a shape, on a portion of the segment, that corresponds to the channel walls of the desired honeycomb structure. The flow segments pass from die body 36′ across the inlet face of die body 37 and are deflected around the transverse surface of pins 46 and interconnecting webs 48. The portion of pins 46 and webs 48 between the outer ring surfaces of die body 37 define another partitioning zone that again subdivides the flow into a series of segments. The exterior surface of the segments take on the shape of another portion of the channel walls that will define the final honeycomb structure. The extension of pins 42 through the partitioning zone of die body 37 again maintains the channel wall shapes formed in the partitioning zone of die body 36′. In addition, the absence of webs 44 from the partitioning zone of die body 37 allows the subadjacent area to be filled with extrudable material and further define the final shape of the walls of the honeycomb structure on the surface of the segments. As the extrudable material is pressed from die body 37 into die body 38, the transverse faces of pins 50 and webs 52 again laterally deflect the extrudable material and subdivide it into another series of segments in a partitioning zone defined by the lateral faces of pins 50 and webs 52. The channel walls are further defined by the lateral surfaces of pins 50 while the extension of pins 42 and 46 through the partitioning zone of die body 38 maintain the form of those portions of the channel walls that have been formed on the surface of the upstream segments. Since pins 42 and 46 are suspended without interconnections in the partitioning zone of die body 38, channel walls can be continuously formed around the entire surface of these pins in the partitioning zone of die body 38. The extrudable material passes from die body 38 into die body 39 where the transverse surfaces of pins 54 and interconnecting webs 56 laterally deflect the extrudable material at the inlet surface of the die and subdivide the extrudable material into yet another series of segments defined by the partitioning zone of die body 39. Like the other partitioning zones, the partitioning zone of die body 39 contains a series of partitions defined by the laterally opposing faces of pins 54 and webs 56. As the extrudable material is pushed past the outer ring of die body 39, it enters a discharge zone that interconnects the volume of the honeycomb structure occupied by webs 56 in the partitioning zone of die body 39.

From FIG. 7, it is readily apparent that the transverse surface about which the extrudable material must deflect as it passes the upstream surface of each die body is greatly reduced relative to the dies of the prior art and even the die of FIG. 1. Therefore, the formation of the honeycomb structure in four steps by the method of this invention using a die arrangement as shown in FIG. 7 will have very low flow resistance. In addition, there are few gaps caused by the interconnecting webs between pins that must be filled in the discharge zone.

Figure 10:
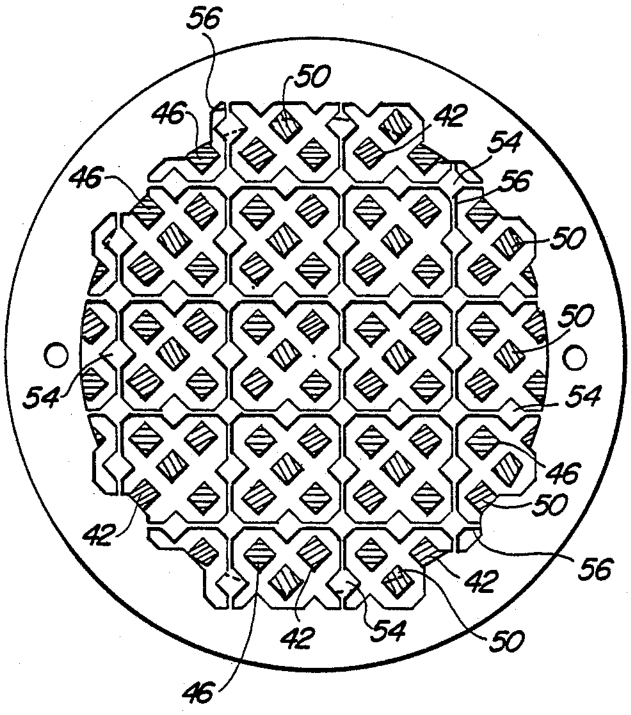
FIG. 10 is a plan view of a lower portion of the die of FIG. 9 taken across line 10—10.

FIG. 10 depicts the transverse area of the pins and webs at the inlet surface of die body 39 and the small number of webs that require final interconnection in the discharge zone. FIG. 10 shows that for the 16 pins surrounded by the dashed lines to form box B, there are in effect only 12 web interconnections that need to be filled in the discharge zone. Another advantage of this method is that the reduced transverse area presented by the inlet surface of the die body reduces the total force imposed across the pins and webs supported by that die body so that the necessary strength for supporting the pins is more readily achieved with less web material.

A variety of materials can be used in this method as the base for the preparation of the honeycomb structure. Starting raw materials for producing a ceramic honeycomb structure include compositions of alumina, ceria-alumina, titania-alumina, zirconia-alumina, mullite, zirconia-cordierite, mullite-alumina, copper oxide containing cordierite, copper oxide containing titania-alumina, anorthite, lithia-alumina-silica, and a combination of the above formulations. These base materials are preferably mixed with extrusion aids to enhance bonding and the plasticizing character of the extrudable material which is in the form of a ceramic dough. Such extrusion aids include methylcellulose material, starch, graphite, guar gum, and other known lubricating materials that are compatible with the base material of the ceramic composition.

EXAMPLE

In order to obtain honeycomb structures using the method of this invention in a die represented by FIGS. 1–4, a die having the configuration depicted in FIGS. 1–5 was manufactured. The die has an overall diameter of approximately 1⅝ inches and an overall thickness of approximately 1¾ inch. The discharge portion of the die was machined to approximately 1-3/16 inch diameter to provide a 3/16 inch shoulder about the circumference of the die. Electric discharge machining was employed to form square pins approximately 0.075 inch in diameter in each die body such that when the die was assembled, the slots of the discharge zone had a width of approximately 0.025 inch. This pattern yields a channel density of about 100 openings per square inch. The thickness of the die was divided about evenly into the first die body, second die body and discharge zone such that each section has a total depth of approximately ¼ inch.

An extrudable material comprising 43 parts of kaolin clay, 38 parts of talc powder, 18 parts of alumina powder to yield 37.9 wt. % alumina, 51.4 wt. % silica, and 13.7 wt. % magnesia were combined with water and methyl cellulose as an extrusion aid were combined into a dough and mixed in a paddle mixer to provide an extrudable material in the form of a mixture resembling bread dough. This mixture was introduced into the cylinder of an extrusion apparatus containing the previously described die. A hydraulic piston produced a pressure of less than 250 psi on the extrudable mixture which forced the mixture through the die at a rate of approximately 0.8 inch/second. An extrusion recovered from the bottom of the apparatus was found to have well formed walls with a thickness of about 0.025 inch between the channel openings. The overall honeycomb structure had approximately 100 openings per square inch. The ceramic honeycomb structure was then dried and fired at temperatures between 1300° F. and 1450° F. which produced a cordierite honeycomb structure with a channel wall shape similar to the shape of the outlets in the discharge zone. Firing reduced the thickness of the channel walls to approximately 0.020 inch and increased the number of channels to approximately 160 openings per square inch.

What is claimed is:

1. A method of forming a honeycomb structure having a plurality of channels with intersecting channel walls from an extrudable material, said method comprising:

(a) pressing said material in substantially axial flow through a first partitioning zone and subdividing the material into a first series of parallel and distinct flow segments and forming at least a first portion of said channel walls on the surface of said flow segments;

(b) passing said extrudable material in substantially axial flow out of said first partitioning zone and maintaining the form of at least part of said first portion of channel walls in said extrudable material;

(c) pressing said extrudable material in substantially axial flow through at least a second partitioning zone, subdividing the feed material into a second series of parallel and distinct flow segments, displacing a portion of the extrudable material from the axial flow path of said first segments to form a second portion of said channel walls on the surface of said segments in said second series, and maintaining at least in part the form of said first portion of channel walls;

(d) passing said material through a discharge zone wherein said extrudable material flows laterally and axially to complete the formation of said channel walls; and (e) discharging an extruded honeycomb structure having a plurality of intersecting channel walls.

2. The method of claim 1 wherein at least a portion of said extrudable material forming the non-intersecting portion of said channel walls passes axially through said partitioning zones without obstruction.

3. The method of claim 1 wherein in said second partitioning zone, extrudable material is displaced from the center of said axial flow path of said first segments to form said second portion of said channel walls.

4. The method of claim 1 wherein said first and second series of segments are partitioned to have substantially the same outer configuration.

5. The method of claim 1 wherein said extrudable materials pass directly out of said first partitioning zone and directly into said second partitioning zone.

6. The method of claim 4 wherein said channels are formed to have the same interior shape.

7. The method of claim 1 wherein at least a portion of said extrudable material forming the intersection portion of said channel walls passes axially through said partitioning zones without obstruction.

8. The method of claim 7 wherein said extrudable material is passed through four partitioning zones.

9. The method of claim 1 wherein said channel walls are formed with a uniform thickness.

10. The method of claim 1 wherein the cross-sections of said channels are formed in geometric shapes that can be packed together without spaces between adjacent shapes.

11. The method of claim 10 wherein said channels are formed with square cross-sections.

12. The method of claim 1 wherein passage of said extrudable material through said partitioning zones produces a number of discontinuities in said channel walls that is less than twice the number of channels formed.

13. The method of claim 1 wherein said extrudable material is selected from the group consisting of alumina, ceria-alumina, titania-alumina, zirconia-alumina, mullite, zirconia-cordierite, mullite-alumina, copper oxide containing cordierite, copper oxide containing titania-alumina, anorthite, lithia-alumina-silica and a mixture thereof.

14. The method of claim 1 wherein a pressure of less than 250 psi is used to press the extrudable material into the first partitioning zone.

15. A method of forming a honeycomb structure having a plurality of channels with intersecting channel walls from an extrudable material, said method comprising:

(a) pressing said material in substantially axial flow through a first partitioning zone and subdividing the material into a first series of parallel and distinct flow segments and forming at least a first portion of said channel walls on the surface of said flow segments;

(b) passing said extrudable material in substantially axial flow out of said first partitioning zone and maintaining the form of at least part of said first portion of channel walls in said extrudable material;

(c) pressing said extrudable material in substantially axial flow through at least a second partitioning zone, subdividing the feed material into a second series of parallel and distinct flow segments, displacing a portion of the extrudable material from the axial flow path of said first segments to form a second portion of said channel walls on the surface of said second segments in said second series, maintaining at least in part the form of said first portion of channel walls and forming finished channel walls in at least a portion of said honeycomb structure;

(d) passing said material through a discharge zone wherein said extrudable material flows laterally and axially to complete the formation of any channel walls not completed in step (c); and (e) discharging an extruded honeycomb structure having a plurality of intersecting channel walls.

16. The method of claim 15 wherein the portion of said extrudable material forming at least one of the intersecting and non-intersecting portions of said channel walls passes axially through said partitioning zones without obstruction.

17. The method of claim 16 wherein in said second partitioning zone, extrudable material is displaced from the center of said axial flow path of said first segments to form said second portion of said channel walls.

18. The method of claim 17 wherein a portion of the channel walls completely surround at least some of the channels before the honeycomb structure enters said discharge zone.

19. The method of claim 18 wherein passage of said extrudable material through said partitioning zones produces a number of breaks in said channel walls that is less than twice the number of formed channels.

* * * * *

UNITED STATES PATENT AND TRADEMARK OFFICE

CERTIFICATE OF CORRECTION

PATENT NO. : 4,812,276

DATED : March 14, 1989

INVENTOR(S) : Tai-Hsiang Chao

It is certified that error appears in the above-identified patent and that said Letters Patent is hereby corrected as shown below:

Column 1, line 26: "extrusison" should read --extrusion--.

Column 9, line 37: "arrangemnt" should read --arrangement--.

Column 11, line 16: "1 3/4" should read --3/4--.

Column 12, line 36: "intersection" should read --intersecting--.

Signed and Sealed this

Seventeenth Day of April, 1990

*Attest:*

HARRY F. MANBECK, JR.

*Attesting Officer* *Commissioner of Patents and Trademarks*